No. 723,070. PATENTED MAR. 17, 1903.
C. W. TAYLOR.
INHALER.
APPLICATION FILED AUG. 12, 1902.
NO MODEL.
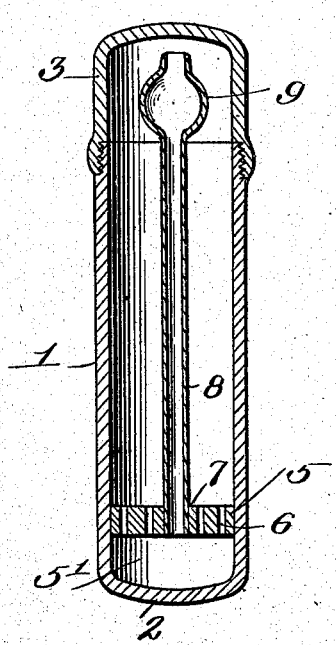
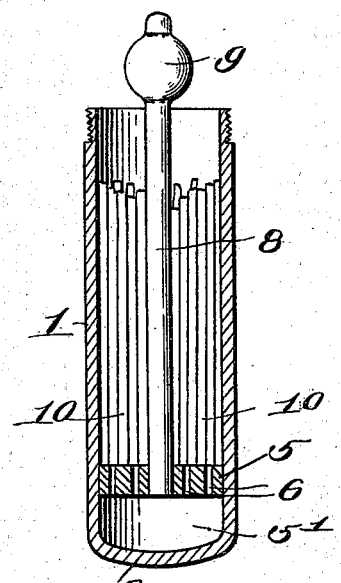
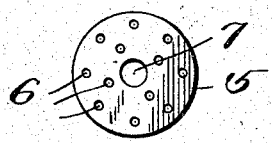
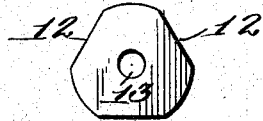
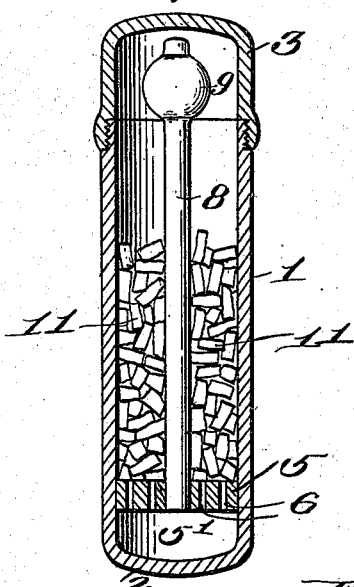
Witnesses:
Inventor
Clarence W. Taylor
By James L. Norris
Atty.

UNITED STATES PATENT OFFICE.

CLARENCE W. TAYLOR, OF SIOUX CITY, IOWA.

INHALER.

SPECIFICATION forming part of Letters Patent No. 723,070, dated March 17, 1903.

Application filed August 12, 1902. Serial No. 119,424. (No model.)

*To all whom it may concern:*

Be it known that I, CLARENCE W. TAYLOR, a citizen of the United States, residing at Sioux City, in the county of Woodbury and State of Iowa, have invented new and useful Improvements in Inhalers, of which the following is a specification.

This invention relates to certain new and useful improvements in inhalers.

The invention aims to construct an inhaler provided with suitable means which will take up and absorb a greater quantity of a highly-volatile medicament than the material generally employed for such purpose.

Medicaments used in inhalers necessarily are of a volatile character, and many of them are in liquid form, or by the union of one inhalant with another the result is a liquid. The objection to the use of solid or crystal medicaments is that particles of such are inhaled and brought into contact with the mucous membrane, besides being unpleasant, tend to aggravate the trouble to be relieved. Where liquids are used, it is common to employ folded cheese-cloth or similar loosely-constructed bibulous material; but its use is generally objectionable, for the reason that it is necessary to prepare, ship, and charge the inhaler, the latter being done by inexperienced purchasers or consumers before the inhaler is capable of use. Another objection to the cheese-cloth or like material is that it does not permit a free circulation of air through the inhaler. Furthermore, inhalers using liquid medicaments will not retain their strength long enough to be of commercial value without repeated recharging by the consumer, and the average person has no time or disposition for the refilling operation. To overcome the foregoing objections, the inhaler is provided with wood pieces acting as the absorbent. These wood pieces may be of any suitable length, preferably rectangular in cross-section—that is to say, the wooden pieces may be in the form of cubes or elongated rectangular strips. The wood employed may be white pine, cedar, balsam, or other suitable wood which will absorb and take up a greater quantity of highly-volatile medicament than the materials now generally used as the absorbent, and, furthermore, by the employment of the wooden pieces it will retain the medicament a much longer time, as well as permitting a thorough circulation of air through the inhaler. By employing the absorbent material of wood which will retain the medicament a much longer time than the absorbent generally employed now it will enable the filling of the inhaler to be done at the laboratory or a physician's office, and it will also overcome the repeated charging or recharging of the inhaler.

A further object of the invention is to provide an improved inhaler of few parts, of practical utility, efficient in its use and comparatively inexpensive to manufacture, and in which the air is compelled to pass through the medicament before reaching the inhaler-tube.

A further object of the invention is to produce an inhaler which can be closed by the placing thereon, or the employment thereof, of a single cap or cover, and which is so constructed that when removed the inhaler will be ready for use; furthermore, the cap or cover closing both the ingress and egress of air to the inhaler when the cap or cover is in position.

A further object of the invention is to enable the use of a greater number of medicaments in a practical, pleasant, and efficient way.

One indication of the scope of an inhaler constructed in the manner as hereinafter described will appear in the treating of the wood or bibulous pieces contained in the inhaler with a liquid or a compound or by the treating of a number of the pieces with some liquid and the remainder of the pieces with another liquid and then associating the pieces in the body of the inhaler. For example, an antiseptic and a perfume may be employed, the former impregnating a number of the pieces of wood and the latter the remaining pieces of wood and the pieces then assembled in the body of the inhaler, or the antiseptic and perfume may be mixed together and the pieces impregnated with the said mixture.

A further object of the invention is to provide an inhaler with a greatly-increased extent of surfaces exposed to the air during its passage through the inhaler, thus making it possible to medicate dry air to be inhaled with the medicine of only slight or no volatile character, especially when associated with a highly-volatile medicine.

With the foregoing and other objects in view the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like numerals of reference indicate corresponding parts throughout the several views, and in which—

Figure 1 is a vertical sectional view of the inhaler with the cap or cover thereon and without the wood pieces or absorbent material. Fig. 2 is a like view with the cap or cover removed and the wood or absorbent material arranged within the inhaler. Fig. 3 is a detail view of the perforated disk within the inhaler. Figs. 4 and 5 are detail views of a modified form of disks; and Fig. 6 is a vertical sectional view of the inhaler, showing a modified form of wood pieces or absorbent material.

Referring to the drawings by reference-numerals, 1 denotes the body or container of the inhaler, which is substantially cylindrical in contour and provided with a closed bottom 2 and an open top. The periphery of the body portion 1, near the top edge thereof, is formed with screw-threads and is adapted to to be engaged by the screw-threads on the inner face of a cap or cover 3. By this arrangement the cap or cover 3 is suitably connected to the body portion of the inhaler for closing the same. Other means may be employed for connecting the cap to the body portion 1 than that as disclosed.

The lower end of the body portion 1 has mounted therein a disk 5, preferably formed of cork, although the disk may be constructed of any suitable material. The disk when mounted within the body portion 1 of the inhaler forms an auxiliary chamber or reservoir 5'. The disk 5 is provided with a series of perforations 6, forming air-passages, and a centrally-arranged opening 7. In the latter is adapted to be mounted the lower end of the inhaler-tube 8. The tube 8 is hollow, with its lower end open, and is provided at its outer or upper end with a bulbous portion 9, which is also open. The bulbous portion 9 may be omitted and the tube made of uniform diameter throughout. The tube 8 is mounted in the disk 5, so that the latter will support the former, and the perforations in the disk 5, as before stated, form the air-passages for the admission of the medicated air to the auxiliary chamber or reservoir 5'.

Within the body portion 1 of the inhaler, above the disk 5, is arranged a series of vertically-extending strips of wood forming the absorbent material for the medicament. As many of these strips 10 may be employed as desired, and these strips 10 are adapted to take up the medicament when the inhaler is supplied therewith.

In Fig. 6 the wood, or rather the absorbent material, is shown as consisting of small pieces substantially cubical, as indicated at 11. The strips 10 or small pieces 11 of wood are adapted to surround the tube 8 above the disk 5, as shown, and in such a manner that the air will pass between the strips and pieces and in some instances through the same and through the perforations 6 into the auxiliary reservoir 5'.

In Figs. 4 and 5 a modified form of disk for closing the body portion 1 of the inhaler is shown. In Fig. 5 the disk is cut away at three parts, forming flat edges, the latter and the walls of the body portion forming the air-inlets. The cut-away portion of the disk in Fig. 4 is designated by the reference-numeral 12. The disk in Fig. 4 is provided with a centrally-arranged opening 13 for the tube 8. In Fig. 5 the edges of the disk are formed with a series of concaved cut-away portions, as at 14, which, in connection with the inner face of the body portion 1 of the inhaler, form the air-inlets. The disk in Fig. 5 is provided with a centrally-arranged opening 15 for the tube 8.

The body portion 1 of the inhaler I term the "container," and it may be constructed of any suitable material, preferably glass or hard rubber. The tube 8 may also be constructed of any suitable material, such as glass or hard rubber, as well as the disk 5. The cover or cap 3 is constructed of a single piece and easily removed from or connected to the body portion of the container and when connected to the latter closes the air-opening and the inhaler-tube, which keeps the latter free from dust, &c.

It will be evident that by constructing an inhaler in the manner set forth—that is, with the disk forming the air-passages arranged at the lower end of the container and mounting the absorbent material above the disk—the air will be compelled to pass through the absorbent material containing the medicaments before it can enter the inhaler-tube, and consequently the air will be thoroughly impregnated with the vapor from the medicament as it passes through the container to the inhaler-tube. The disk forms what may be termed "an auxiliary chamber or reservoir" at the bottom of the container for the medicated air before the same passes through the inhaler-tube to be used.

The inhaler is ready for use when the cap is removed, as no impractical parts are required to register or coöperate with the other parts. An advantage possessed by the inhaler is that the physicians can medicate the wood or absorbent material with their own medicaments prescribed for special cases.

It is thought the many advantages of my improved inhaler can be fully understood from the foregoing description taken in connection with the accompanying drawings, and it will be noted that minor changes in the details of construction may be made without departing from the general spirit of my invention.

Having thus fully described my invention, what I claim as new, and desire to secure by Letters Patent, is—

1. In an inhaler, a container having a closed bottom and an open top, a disk suitably cut away to form air-passages and secured within the container near the bottom thereof, a tube supported by the said disk, a cap adapted to be connected to the inhaler for closing the same, and a suitable absorbent material arranged within the container.

2. In an inhaler, a container having a closed bottom and an open top, a disk suitably cut away to form air-passages and secured within the container near the bottom thereof, a tube extending in said disk, a cap adapted to be connected to the inhaler for closing the same, and pieces of wood forming an absorbent material arranged in the said container.

3. In an inhaler, a container having a closed bottom and an open top, a disk suitably cut away to form air-passages and secured within the container near the bottom thereof, a tube supported by said disk, a cap adapted to be connected to the inhaler for closing the same, and a series of vertically-extending strips of wood forming an absorbent material suitably arranged within said container.

4. In an inhaler, a container, a perforated disk mounted therein near the bottom thereof and forming an auxiliary chamber, and an inhaler-tube extending in said container and communicating with said auxiliary chamber.

5. In an inhaler, a container, a disk mounted in the said container near the bottom thereof and forming an auxiliary chamber within the container, an inhaler-tube extending in said disk and communicating with said auxiliary chamber, and wood pieces mounted in said container above the said disk.

6. In an inhaler, a container, a disk mounted in the said container near the bottom thereof and forming an auxiliary chamber within the container, an inhaler-tube supported by said disk and communicating with said auxiliary chamber, and elongated strips of wood arranged in said container above the said disk.

7. An inhaler comprising a container, means mounted therein for dividing the said container into two chambers, said means so constructed as to form air-inlets for the lower of said chambers, and an inhaler-tube supported by said means and communicating with the lower of said chambers.

8. An inhaler comprising a container, means mounted therein for dividing the said container into two chambers, said means so constructed as to form air-inlets for the lower of said chambers, an inhaler-tube supported by said means and communicating with the lower of said chambers, and means for closing the upper of said chambers.

9. An inhaler comprising a container, means suitably arranged therein for dividing the said container into two chambers, said means so constructed as to form air-inlets for the lower of said chambers, and a vertically-extending inhaler-tube supported at its lower end by the said means and communicating with the lower of said chambers, the upper end of said inhaler-tube provided with a bulbous portion.

10. An inhaler comprising a container, a perforated disk mounted therein and adapted to divide the container into two chambers, an inhaler-tube supported at its lower end by said disk and communicating with the lower of said chambers, vertically-extending strips of wood mounted upon said disk and surrounding said tube, and a cap for closing the upper of said chambers.

In testimony whereof I have hereunto set my hand in presence of two subscribing witnesses.

CLARENCE W. TAYLOR.

Witnesses:
R. H. BROWN,
GRANT J. ROSS.